(12) United States Patent
Yagyu (10) Patent No.: US 8,001,944 B2
(45) Date of Patent: Aug. 23, 2011

(54) ENGINE START CONTROL SYSTEM HAVING FAILSAFE ARRANGEMENT

(75) Inventor: Hiroshi Yagyu, Tsushima (JP)

(73) Assignee: Denso Corporation, Kariya (JP)

( * ) Notice: Subject to any disclaimer, the term of this patent is extended or adjusted under 35 U.S.C. 154(b) by 261 days.

(21) Appl. No.: 11/790,571

(22) Filed: Apr. 26, 2007

(65) Prior Publication Data

US 2007/0261653 A1 Nov. 15, 2007

(30) Foreign Application Priority Data

May 12, 2006 (JP) .................................. 2006-134468

(51) Int. Cl.
*F02N 11/08* (2006.01)
(52) U.S. Cl. .................................................... 123/179.3
(58) Field of Classification Search ............... 123/179.1, 123/179.2, 179.3, 179.24; 477/203; 307/10.3, 307/10.4
See application file for complete search history.

(56) References Cited

U.S. PATENT DOCUMENTS

| | | | | |
|---|---|---|---|---|
| 3,489,912 A | * | 1/1970 | Hoffman, Jr. ................... | 307/9.1 |
| 3,794,845 A | * | 2/1974 | Riddoch ...................... | 290/38 R |
| 3,885,543 A | * | 5/1975 | Swartz ......................... | 123/179.3 |
| 4,186,710 A | * | 2/1980 | Kilgore .................. | 123/146.5 B |
| 5,593,367 A | * | 1/1997 | Eavenson et al. ............. | 477/203 |
| 5,775,448 A | * | 7/1998 | Hirahara et al. ........... | 180/24.02 |
| 6,116,201 A | * | 9/2000 | LaBelle ....................... | 123/179.2 |
| 6,681,904 B1 | * | 1/2004 | Hosford et al. ............... | 188/265 |
| 7,156,772 B2 | * | 1/2007 | Ohtaki et al. .................... | 477/99 |
| 7,279,806 B2 | * | 10/2007 | Hale et al. ..................... | 307/10.4 |
| 7,317,376 B2 | | 1/2008 | Nakamura et al. | |
| 7,407,464 B2 | | 8/2008 | Tanioka et al. | |
| 7,520,533 B1 | * | 4/2009 | Skaurud ........................ | 280/808 |
| 2003/0150416 A1 | * | 8/2003 | Flick .......................... | 123/179.2 |
| 2004/0212252 A1 | * | 10/2004 | Ohtaki et al. ................. | 307/10.3 |
| 2005/0020212 A1 | | 1/2005 | Hiramitsu et al. | |
| 2005/0224034 A1 | * | 10/2005 | Janisch ....................... | 123/179.2 |
| 2006/0036358 A1 | * | 2/2006 | Hale et al. ........................ | 701/45 |
| 2006/0258508 A1 | * | 11/2006 | Tanioka et al. ............... | 477/203 |
| 2007/0056792 A1 | * | 3/2007 | Hildebrand et al. .......... | 180/287 |

FOREIGN PATENT DOCUMENTS

DE 4424879 C2 1/1996

(Continued)

OTHER PUBLICATIONS

Chinese Office Action dated Oct. 17, 2008 issued in counterpart Chinese application No. 200710106814.3, with English translation.

(Continued)

*Primary Examiner* — Erick Solis
*Assistant Examiner* — Sizo B Vilakazi
(74) *Attorney, Agent, or Firm* — Nixon & Vanderhye P.C.

(57) ABSTRACT

An engine start control system for a vehicle includes a first switch with which a user operates to start the engine, a second switch, a third switch, a brake switch and an engine start control unit for controlling start of the engine. The engine start control unit provides a normal mode that allows to start the engine when the first switch is operated if the brake switch detects operation of the brake pedal and a failsafe mode that allows to start the engine when at least two of the first, second and third switches are operated even if the brake switch does not detect operation of the brake pedal.

12 Claims, 10 Drawing Sheets

FOREIGN PATENT DOCUMENTS

| | | |
|---|---|---|
| DE | 10234083 A1 | 2/2004 |
| DE | 10320788 A1 | 12/2004 |
| DE | 102005035167 A1 | 3/2006 |
| JP | 07-329715 | 12/1995 |
| JP | 2004-324469 | 11/2004 |

OTHER PUBLICATIONS

Office Action dated Jan. 8, 2010 issued in corresponding Chinese Application No. 200710106814.3 with an at least partial English-language translation thereof.

Chinese Office Action dated Apr. 3, 2009, issued in corresponding Chinese Application No. 200710106814.3, with English translation.

Office Action issued Jul. 17, 2009 in corresponding Chinese Application No. 200710106814.3 and an at least partial English language translation thereof.

Office Action dated May 19, 2010 (3 pgs.) issued in corresponding German Application No. 10 2007 020 803.2-26 with an at least partial English-language translation thereof (pp. 1-5).

* cited by examiner

FIG. 15B

ENGINE START CONTROL SYSTEM HAVING FAILSAFE ARRANGEMENT

CROSS REFERENCE TO RELATED APPLICATION

The present application is based on and claims priority from Japanese Patent Application 2006-134468, filed May 12, 2006, the contents of which are incorporated herein by reference.

BACKGROUND OF THE INVENTION

1. Field of the Invention

The present invention relates to an engine start control system having a fail-safe arrangement.

2. Description of the Related Art

A key-less engine start system for starting an engine of a vehicle has been adopted widely. In a system called "a smart push-start system", an ID-verification for engine starting is conducted between a portable wireless transmitter-receiver and an on-vehicle transmitter-receiver. When the user having the portable transmitter-receiver gets in the vehicle and pushes a push button switch of the vehicle while the user is pressing the brake pedal by his or her foot, the engine is started.

JP-2004-324469A discloses such a system, in which the engine is not started even if the push button switch is pushed unless a user presses the brake pedal. For this purpose, a brake switch for turning on a brake lamp or a sensor for detecting turn-on of the brake lamp of the vehicle is used.

If such a brake switch, the sensor or its connecting wire breaks down, the engine is not started even if the push button switch is pushed while the brake pedal is being pressed. In the case that the brake pedal operation of the vehicle is assisted by a hydraulic booster, the brake switch or sensor may not function if the booster fails to assist the driver's pressing the brake pedal. Because the brake switch or sensor has been used only when the brake lamp is turning on, no particular countermeasure against the failure of the brake switch or sensor has been taken. That is, the brake switch or sensor may fail at a certain probability, so that the smart push-start system may not function very well.

SUMMARY OF THE INVENTION

Therefore, an object of the invention is to provide an engine start control system that can start an engine when a driver pushes a push button switch of the starter with the driver's foot pressing the brake pedal, even if the operation of the brake pedal is not detected.

According to a feature of the invention, an engine start control system includes a first switch with which a user operates to start an engine, a second switch, a brake sensor for detecting operation of the brake pedal and an engine start control unit for controlling start of the engine. The engine start control unit provides a normal mode that allows to start the engine when the first switch is operated if the brake sensor detects operation of the brake pedal and a failsafe mode that allows to start the engine when the first and second switch are operated even if the brake sensor does not detect operation of the engine.

When the brake sensor detects operation of the brake pedal, the engine start control unit operates in the normal mode if the first switch is turned on. When, on the other hand, the brake sensor does not detects the operation of brake pedal, the engine start control section operates in the failsafe mode in which the engine is allowed to start if the first and second switches are turned on.

Therefore, it is possible to start the engine even if the engine can not be started in the normal way by accident, such as a failure of the hydraulic brake system or a breakdown of the connecting wire of the brake switch, to carry the vehicle to a service station or to operate an air conditioner while stopping the vehicle.

In the above engine start control system, the second switch may be a hazard warning switch, which gives the user an impression that the failsafe mode starting is an emergent action.

The above engine start control switch may further include a third switch, so that the engine start control unit can allow to start the engine in the failsafe mode only when the second switch and third switch are operated.

In the above engine start control system: each of the first and the second switches may be a push button type momentary switch; the engine start control unit may allow to start the engine in the failsafe mode only when the first and the second switches are operated in a prescribed manner; or the second switch may be a brake follower switch.

According to another feature of the invention, an engine start control system for a vehicle includes a first switch with which a user operates to start the engine, a second switch, a third switch, a brake sensor for detecting operation of the brake pedal and an engine start control unit for controlling start of the engine. The engine start control unit provides a normal mode that allows to start the engine when the first switch is operated if the sensing means detects operation of the brake pedal and a failsafe mode that allows to start the engine when at least two of the first, second and third switches are operated even if the brake sensor does not detect operation of the brake pedal.

In the above engine start control system: the second switch may be a hazard warning switch; and the third switch may be a brake follower switch of a cruise control system.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A couple of preferred embodiments according to the present invention will be described with reference to the appended drawings.

An engine start control system 1 according to the first embodiment of the invention will be described with reference to FIGS. 1-6.

Figure 1:
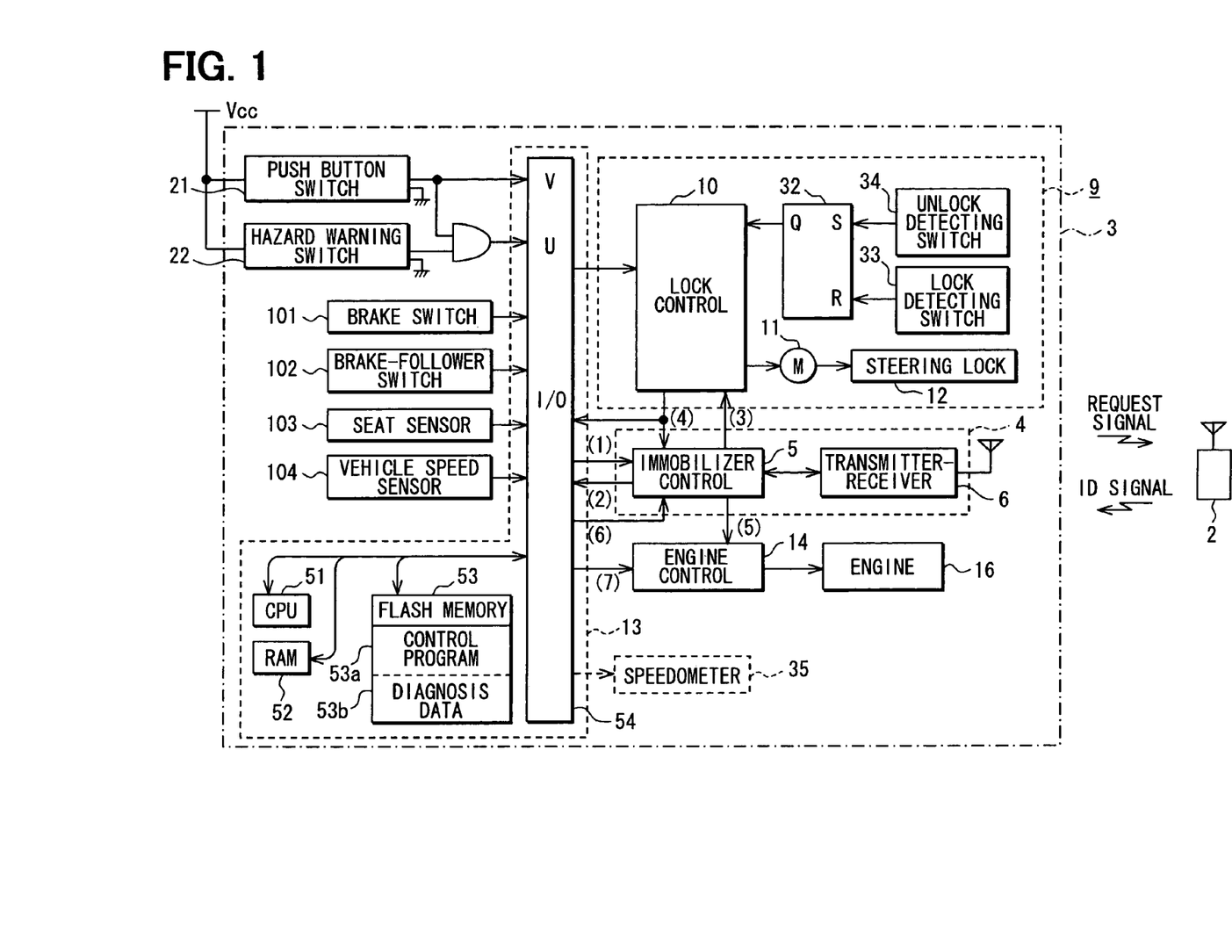
FIG. 1 is a block diagram of an engine start control system according to the first embodiment of the invention.

As shown in FIG. 1, a vehicle 3 communicates with a smart key (i.e. a portable transmitter-receiver) 2. The vehicle 3 is equipped with a controller 4, an steering lock unit 9, an engine start control unit 13, an engine control unit 14, an engine 16, a push button switch 21, a hazard warning switch 22, a brake switch 101, a brake-follower switch 102, a seat sensor 103, a vehicle speed sensor 104, etc.

The engine start control system 1 according to the first embodiment of the invention includes the smart key 2, the controller 4, the engine start control unit 13, the push button switch 21, the hazard warning switch 22, the brake switch 101 and the brake-follower switch 102.

The smart key 2 has a verification ID. The controller 4 includes an immobilizer control unit 5 and a transmitter-receiver unit 6. The immobilizer control unit 5 intermittently sends the vehicle a request signal via the transmitter-receiver unit 6. When a driver having the smart key 2 gets in the vehicle, the smart key 2 receives the request signal. The smart key 2 sends the verification ID to the immobilizer control unit 5 via the transmitter-receiver unit 6. When the immobilizer 5 receives the verification ID, it verifies the verification ID with a master ID that has been registered in an on-vehicle memory beforehand. The steering lock unit 9 includes a lock control section 10, a steering lock motor 11, a mechanical lock device 12, a flip flop circuit 32, a lock detecting switch 33 and an unlock detecting switch 34, which are well-known.

The immobilizer control unit 5, the lock control section 10, the engine start control unit 13 and the engine control unit 14, each of which is constructed of a microcomputer that includes a CPU, a ROM, a RAM and an I/O port, are connected with each other as a net work.

The engine start control unit 13 includes a CPU 51, a RAM 52, a flash memory 53 and an I/O port 54. The flash memory 53 stores control programs 53a and diagnosis data 53b. The I/O port 54 is connected with the push button switch 21 and the hazard warning switch 22 together with the brake switch 101, the brake-follower switch 102, the seat sensor 103 and the vehicle speed sensor 104.

Figure 11:
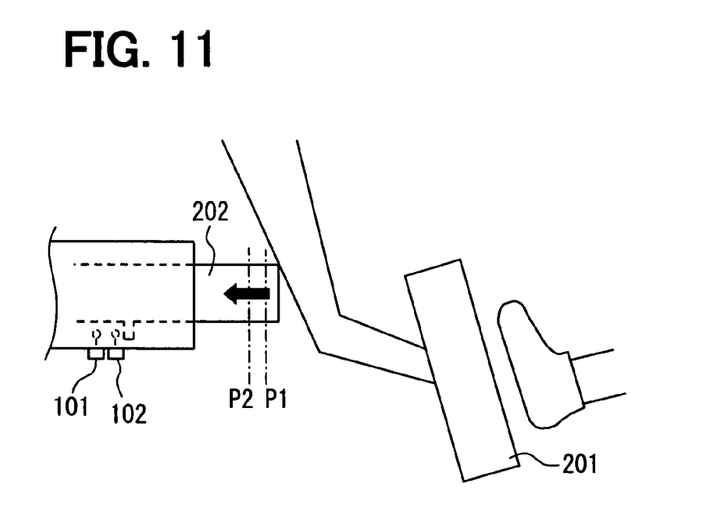
FIG. 11 is a schematic diagram showing a relation among the pressing stroke of a brake pedal, a brake switch and a brake-follower switch.

As shown in FIG. 11, the brake switch 101 is disposed near an operating rod 202 of a brake to be normally open. The brake switch 101 is closed to turn on a brake lamp 101L when the driver presses the brake pedal 201 so as to move the operating rod 202 to a preset position P2. The brake-follower switch 102 is also disposed near the operating rod 202 of the brake as a cruise-control-switch to be normally closed. The cruise control switch provides a trigger signal to stop cruise control when the driver presses the brake pedal 201.

Figure 13:
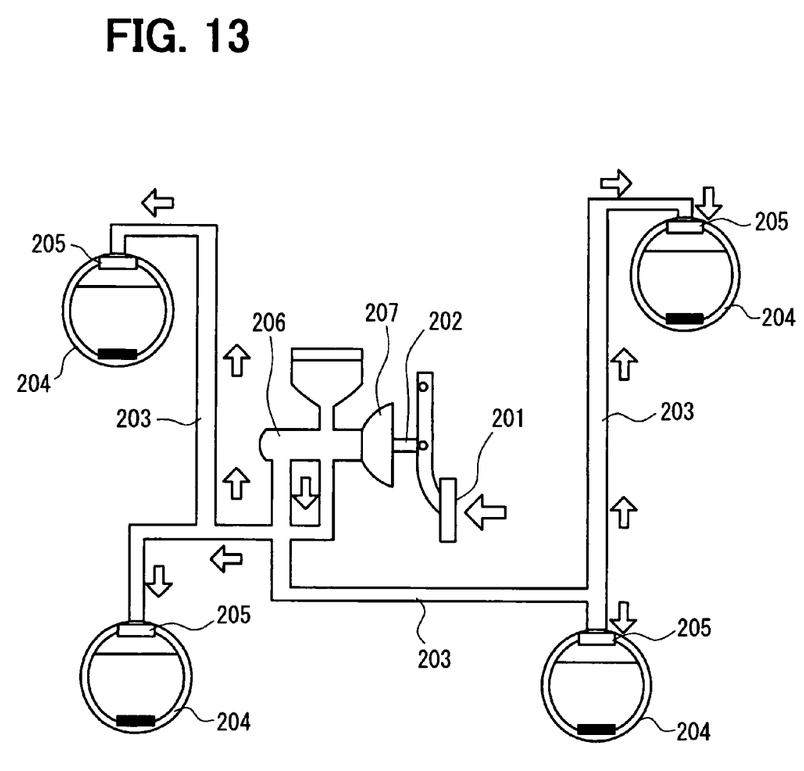
FIG. 13 is a schematic diagram illustrating a hydraulic brake system.

As shown in FIG. 13, the vehicle is equipped with a hydraulic brake that has a brake pipe circuit 203, brake members 204, wheel cylinders 205, a master cylinder 206 and a brake booster 207. The oil pressure of the master cylinder 206 is supplied to each of the wheel cylinders 205 via the brake pipe circuit 203. When the brake pedal 201 is pressed down, the pressing force of the brake pedal is boosted by the brake booster 207 that is driven by the suction pressure of the engine and transmitted to the master cylinder 206.

Figure 14A:
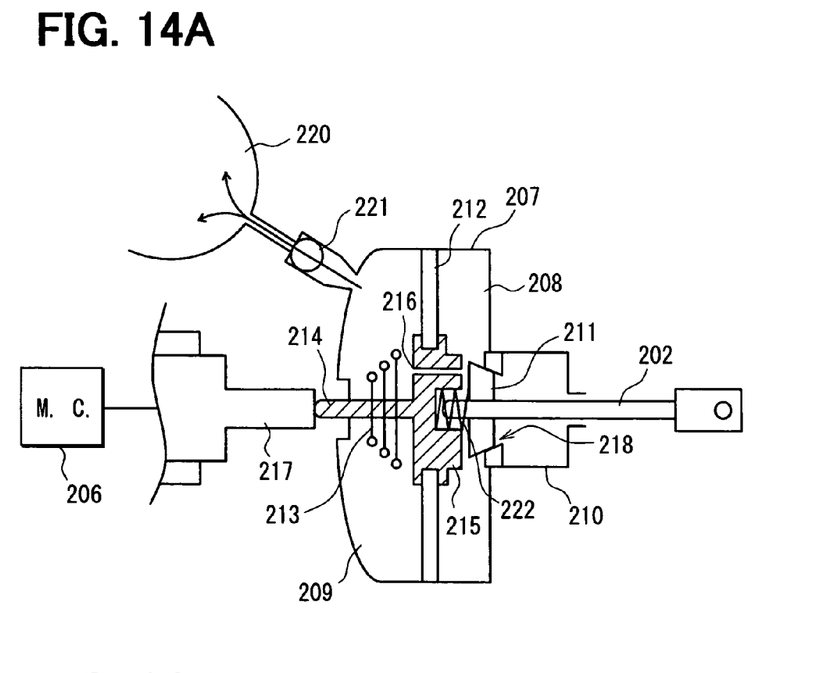
FIGS. 14A and 14B are schematic diagrams illustrating operations of a brake booster.
Figure 14B:
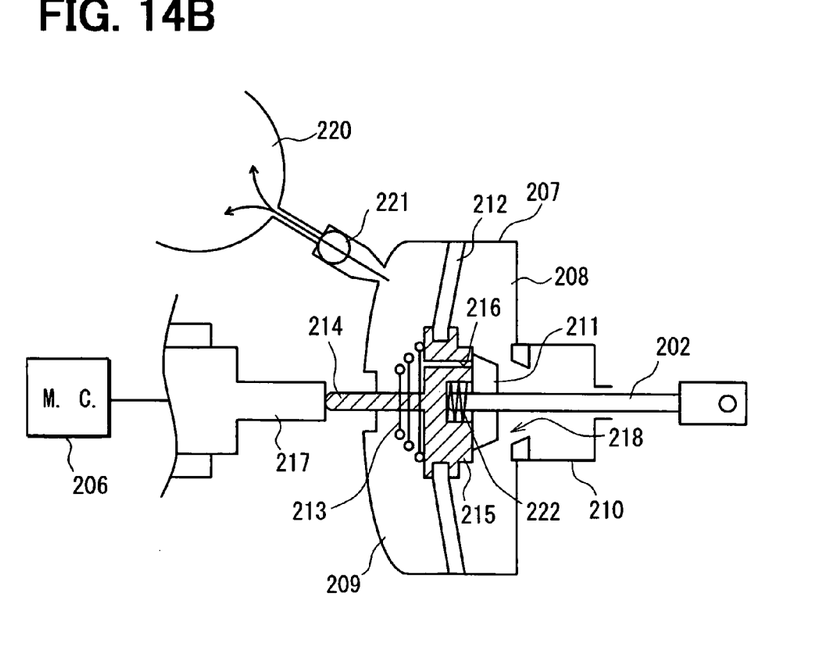

As shown in FIGS. 14A and 14B, the brake booster 207 is constructed of a rubber diaphragm 212 and a diaphragm support 215. The diaphragm 212 divides the inside of the brake booster 207 into a first chamber 209 and a second chamber 208. The first chamber 209 communicates with the intake manifold of the engine 16 via a check valve 221 and the second chamber 209 communicates with an air pressure chamber 210 via a first communication hole 218. The operating rod 202 is driven by the brake pedal 201. The operating rod 202 has one end inserted into the second chamber 208 through the air pressure chamber 210 to push the diaphragm support 215 when it is pushed by the brake pedal 201.

The diaphragm support 215 has an integrated push rod 214 that pushes a piston rod 217 of the master cylinder 206. The diaphragm support 215 is biased by a back up spring 213 that is disposed in the first chamber 209 toward the second chamber 208. The diaphragm support 215 further has a second communication hole 216 that connects the first chamber 209 and the second chamber 208. A valve member 211 is fixed to the operating rod 202 at the middle portion thereof to close the second communication hole when the brake pedal 201 is pressed down to move the operating rod 202 forward and to close the first communication hole 218 when the brake pedal is released to let the operating rod 202 move backward. Incidentally, the valve member 211 is normally biased by a valve return spring to close the first communication hole 218.

When the brake pedal 201 is pressed down with the engine 16 in operation, the operating rod 202, together with the valve member 211, moves forward against the valve return spring 222, as shown in FIG. 14B. Accordingly, the second communication hole is closed, and the first communication hole is opened, so that the atmospheric pressure is introduced. As a result, a pressure difference is generated between the first chamber 209 on one side of the diaphragm 212 and the second chamber 208 on the other side of the diaphragm 212. This pressure difference assists the driver in pushing the operating rod 202 with the brake pedal 201.

When the brake pedal is released after the engine has started, the valve member 211 is pushed by the valve return spring 222 backward to close the first communication hole 218 and to open the second communication hole 216, as shown in FIG. 14A. Accordingly, the suction pressure generated in the intake manifold 220 is introduced into the first chamber 209 and also into the second chamber 208, so that the diaphragm support 215 moves backward together with the operating rod 202.

When the engine 16 stops, the suction pressure remains in the intake manifold for a while, so that the brake assistance by the brake booster continues for a while.

Figure 12:
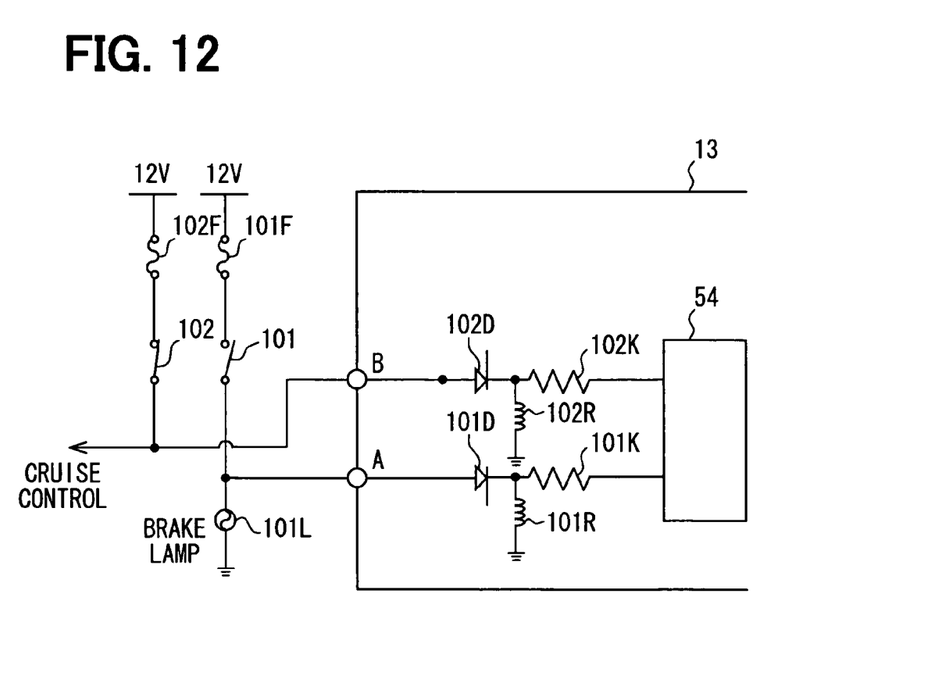
FIG. 12 is a circuit diagram of a circuit for inputting the output signals of the brake switch and the brake-follower switch.

As shown in FIG. 12, the brake switch 101 turns on the brake lamp 101L when the brake pedal 201 is pressed down. The brake lamp 101L is connected to a 12V-power source via the brake switch 101 and a fuse 101F. The engine start control unit 13 includes an input terminal A from which a switch signal of the brake switch 101 is sent to the I/O port 54 via a diode 101D and an impedance adjusting resistor 101K with a pull down resistor 101R, which has one end connected with the junction of the diode 101D and the resistance 101K and the other end connected with a ground. The engine start control unit 13 also includes an input terminal B from which a switch signal of the brake-follower switch 102 is sent to the I/O port 54 via a diode 102D and an impedance adjusting resistor 102K with a pull down resistor 102R, which has one end connected with the junction of the diode 102D and the resistance 102K and the other end connected with a ground.

A cruise control system is connected to a 12V-power source via the brake-follower switch 102 and a fuse 102F.

The switch signal of the brake switch 101 becomes a high state if the brake switch 101 is turned on. If the push button switch 21 is pushed at the same time, the engine 16 is started.

The switch signal becomes a low state in the following case: (i) the brake switch 101 is turned off; (ii) a wire connecting the brake switch breaks down; or (iii) the fuse 101F breaks down. In each case, the engine 16 can be started in a failsafe mode operation if both the push button switch 21 and the hazard warning switch 22 are turned on. Each time the engine is started in the failsafe mode operation, the history of the failsafe mode operation is recorded in the flash memory 53 as one of diagnosis data.

When the push button switch 21 is turned on, a turn-on signal is inputted to a terminal V of the I/O port 54. When both the push button switch 21 and the hazard warning switch 22 are turned on, a turn-on signal is inputted to a terminal U of the I/O port 54.

Figure 15A:
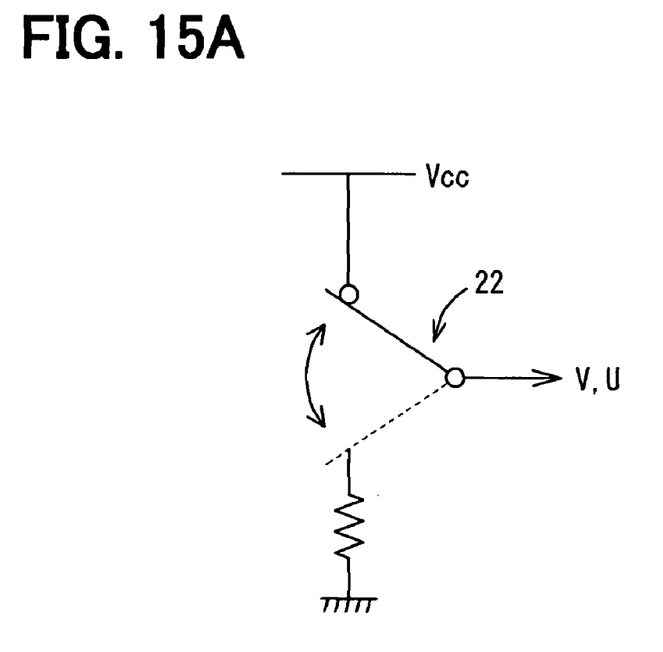
FIGS. 15A and 15B illustrate examples of types of the push button switch and/or a hazard switch.
Figure 15B:
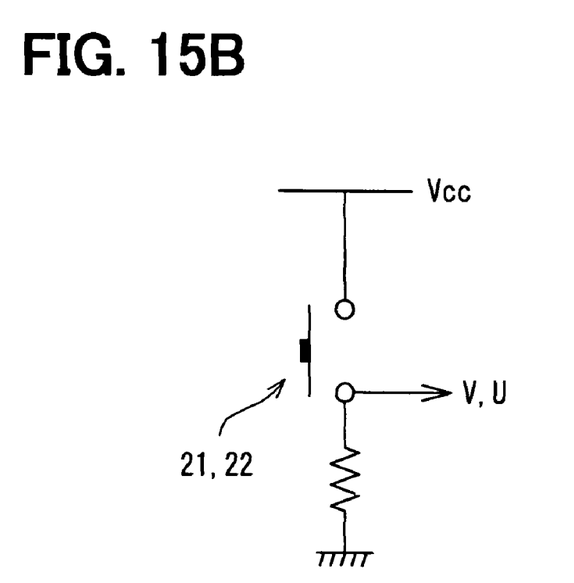

As shown in FIG. 15B, the push button switch 21 is a momentary switch. The momentary switch normally provides a low state signal, while it provides a high state signal only when it is pushed.

The hazard warning switch 22, which is also a momentary switch, suggests that the failsafe mode operation is an emergency operation. When the engine is started in the failsafe mode, a hazard warning lamp flushes, so that the driver can recognize that the engine starting in the failsafe mode is an emergency operation. However, it can be replaced with a toggle switch shown in FIG. 15A that has two stable states. The hazard warning switch 22 may be replaced with another switch such as a switch of an air conditioner or a switch of an audio device.

If the brake-follower switch 102 detects the operation of the brake pedal 201, the engine start control unit 13 can allow to start the engine by operating the push button switch 21 even when the brake switch 101 turns off. This case is also recorded in the flash memory 53.

As shown in FIG. 11, the brake-follower switch (or the cruise control switch) 102 is a normally-closed limit switch, which immediately opens to stop the cruise control if the brake pedal 201 is pressed down a little (e.g. position P1). On the other hand, the brake switch 101 is a normally-open limit switch, which closes to turn on a brake lamp if the brake pedal 201 is pressed down by a certain stroke (e.g. position P2).

When the brake pedal 201 is pressed down, the normally closed brake-follower switch 102 is opened. When the brake pedal 201 is further pressed down, the normally open brake switch 101 is closed. It is possible to start the engine when the brake follower switch 102 is opened even if the brake switch 101 is not closed by accident, such as a failure of the hydraulic brake system or a breakdown of the connecting wire of the brake switch 101.

Figure 2:
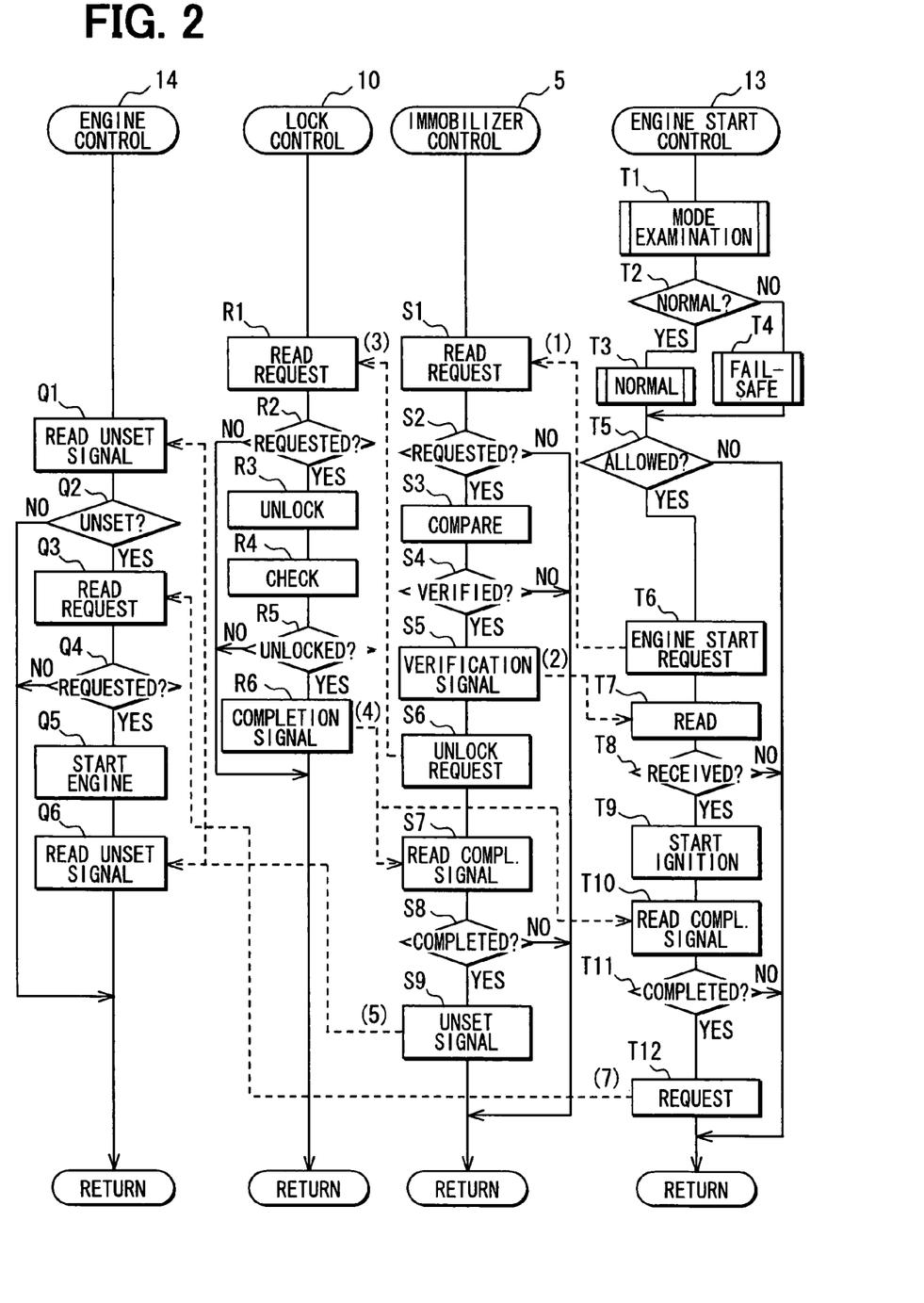
FIG. 2 is a flow diagram showing a control process of the engine start control system shown in FIG. 1.

The operation of the engine start control system will be described with reference to the flow diagram shown in FIG. 2.

Firstly, the engine start control unit 13 conduct a failsafe mode examination at step T1. If the brake switch 101 is normal, "Yes" is given at step T2, which is followed by step T3, where a normal engine starting mode examination is conducted. If, on the other hand, the brake switch 101 is not normal, "No" is given at step T2, which is followed by step T4, where a failsafe starting examination is conducted.

Figure 3:
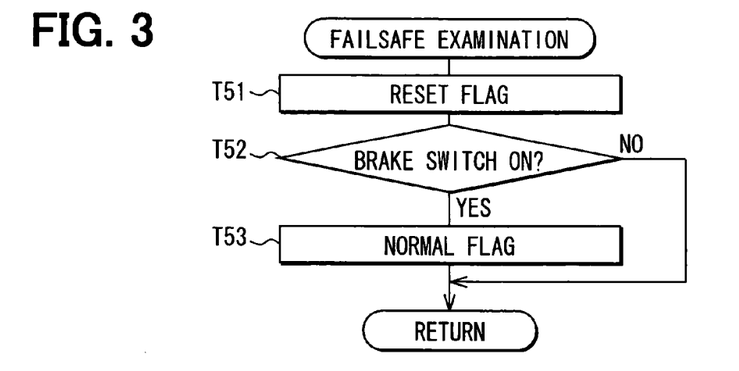
FIG. 3 is a flow diagram of a failsafe examination process.

A flow diagram of the failsafe mode examination using a failsafe mode switch other than the brake-follower switch 102 is shown in FIG. 3. Firstly, a flag is reset to "0" at T51, where "1" is raised if the result of the examination is normal. Then, whether the brake switch 101 is turned on or not is examined at step T52. If the result is Yes, the flag is set to "1" at step T53. Otherwise, the step T53 is skipped. That is, "0" is raised at step T51.

Incidentally, when the brake switch 101 is not turned on (i.e. the brake switch 101 does not sense the operation of the brake pedal 201) at the step T52, a display urging the failsafe engine starting mode may be given at the speedometer of the vehicle.

Figure 4:
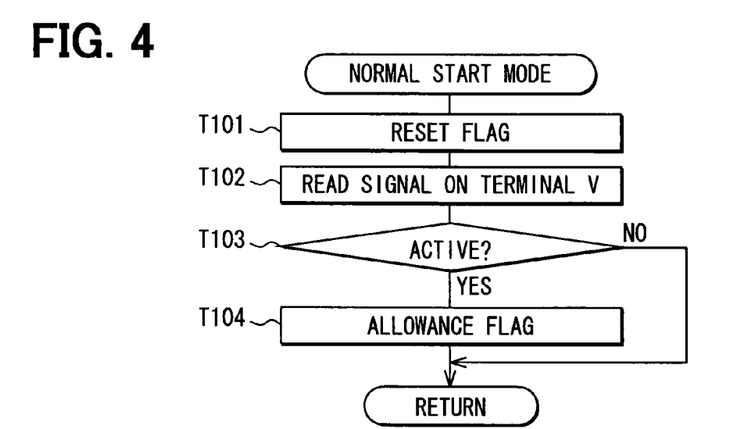
FIG. 4 is a flow diagram of a normal start mode examination process.

A flow diagram of the normal engine starting mode examination is shown in FIG. 4.

Firstly, a start allowance flag is reset at T101, where "1" is raised if the examination indicates a start allowance and "0" is raised if the examination does not indicate the allowance. Then, the turn-on signal inputted to the terminal V is read at T102, and whether the pushbutton switch 21 is pushed to be active or not is examined at step T103. If the push button switch 21 is active (Yes), the start allowance flag "1" is raised at step T104. Otherwise, the step 104 is skipped, and the step T101 returns to repeat the steps T102-T104.

Figure 5:
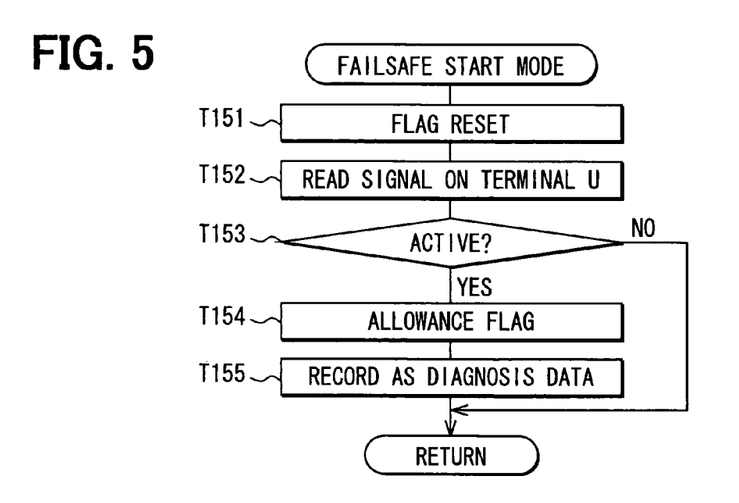
FIG. 5 is a flow diagram of a failsafe start mode examination process.

A flow diagram of the failsafe engine starting mode examination is shown in FIG. 5.

Firstly, a failsafe start allowance flag is reset at T151, where flag "1" is raised if the examination indicates the start allowance, otherwise "0" is raised. Then, the turn-on signal inputted into the terminal U is read at T152, and whether the pushbutton switch is pushed to be active or not is examined at step T153. If both the push button switch 21 and the hazard warning switch 22 are pushed and active (Yes), the start allowance flag "1" is raised at step T154, and step T155 follows to record the failsafe engine starting as one of the diagnosis data in the flash memory 53. Otherwise, the steps 154, 155 are skipped, and the step T151 returns to repeat the steps T152-T155.

Figure 6:
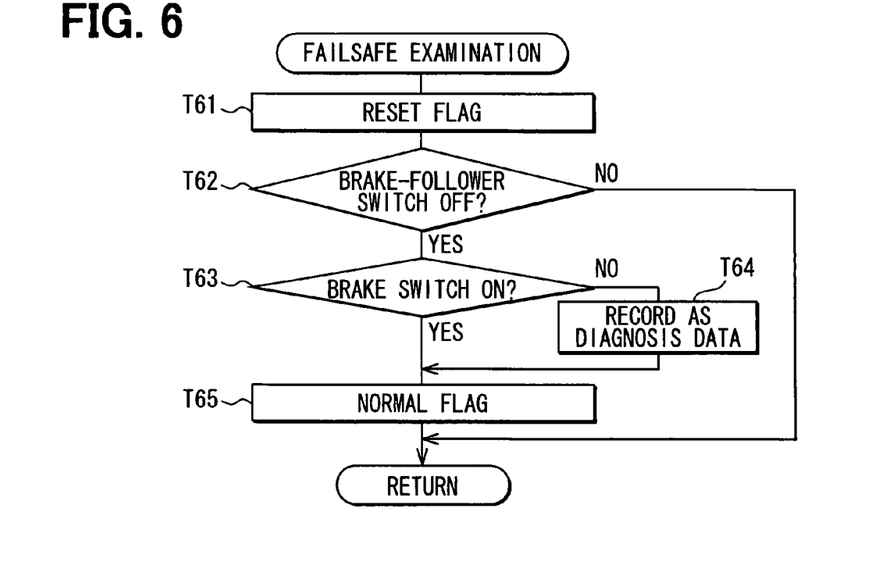
FIG. 6 is a flow diagram of another failsafe examination process.

A flow diagram of the failsafe mode examination in case of the brake-follower switch 102 being used together with the push button switch 21 to initiate the failsafe engine start mode is shown in FIG. 6.

Firstly, a failsafe flag is reset to "0" at T61. Then, the turn-on signal inputted into the terminal U is read at T62, and whether the brake-follower switch 102 (i.e. the cruise control switch) is turned off or not is examined at step T153. If the result of the examination is Yes, step T63 follows to examine whether the brake switch 101 is turned on or not. If the brake switch 101 is turned on (Yes), step T65 follows to raise a normal flag. Otherwise (No), step T64 follows to record this case into the flash memory 53 as one of the diagnosis data 53b. Thereafter, the failsafe flag that indicates the normal operation is raised.

If the result of the examination at step T62 is No, the steps T63, T65 are skipped, and the step T61 returns to repeat the steps T61-T65.

Returning to FIG. 2, an engine start control process starts if the start allowance flag is raised at step T5.

Firstly, an engine start request signal (1) is sent to the immobilizer control unit 5 at step T6. When the immobilizer control unit 5 receives the engine start request signal (1), it verifies the verification ID of the smart key with the master ID of the vehicle and sends a verification signal (2) to the engine start control unit 13 (steps S1-S5). The immobilizer control unit 5 sends the lock control section 10 an unlock request signal (3) at step S6. When the lock control section 10 receives the unlock request signal (3) at steps R1 and R2, it drives the steering lock motor 11 to unlock the steering lock 12 at step R3. When the steering lock 12 is checked and found unlocked at steps R4 and R5, the immobilizer control unit 5 and the engine start control unit 13, the lock control section 10 sends the immobilizer control unit 5 and the engine start control unit 13 an unlock completion signal (4) at step R6. Incidentally, when the engine start control unit receives the verification signal (2), it sends an engine ignition system an ignition signal (6) to make the ignition system active.

When the immobilizer control unit 5 receives the unlock completion signal (4) at steps S7 and S8, it sends the engine control unit 14 an immobilizer operation signal (5) to unset the immobilizer. Incidentally, the immobilizer operation signal unsets the immobilizer when it is active and sets the immobilizer when it is inactive. When the engine start control unit 13 receives the unlock completion signal (4) at steps T10 and T11, it sends the engine control unit 14 a starter operation request signal (7) at step T12.

The engine control unit 14 monitors the immobilizer operation signal (5) and continues to stand by until the immobilizer operation signal (5) becomes active to unset the immobilizer at steps Q1 and Q2. When the immobilizer is unset, the engine control unit 14 reads the starter operation request signal (7) at steps Q3 and Q4 to start the engine if the starter operation request signal is active at step Q5.

Figure 7:
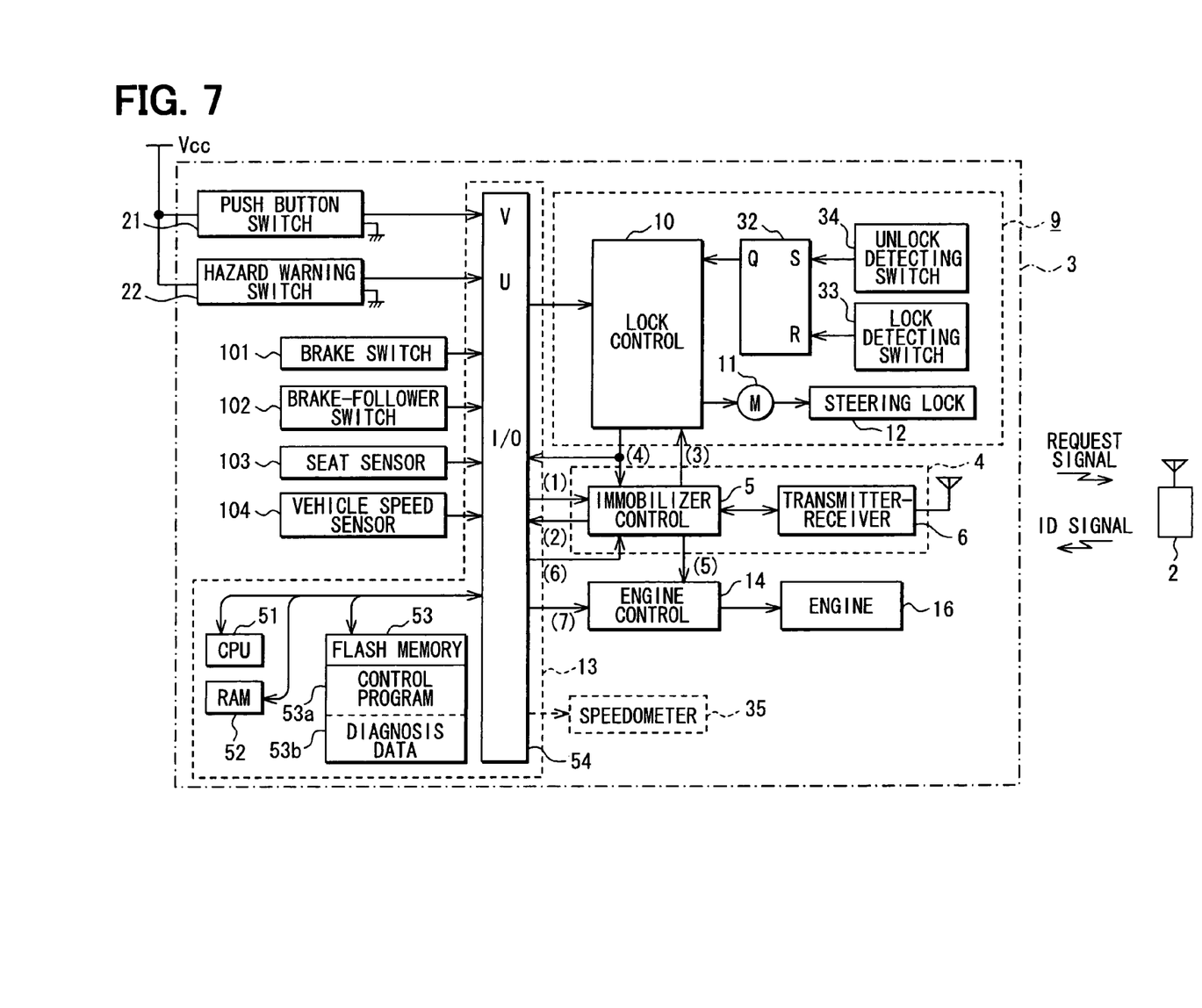
FIG. 7 is a block diagram of an engine start control system according to the second embodiment of the invention.

Another embodiment of the invention will be described with reference to FIG. 7. Incidentally, the same reference numeral or character as the first embodiment indicates the same or substantially the dame portion, part or component as the first embodiment hereafter.

In this embodiment, the output signal of the push button switch 21 and the output signal of the hazard warning switch U are separately inputted to the engine start control unit 13. In more detail, the output signal of the push button switch 21 is inputted to the V terminal, while the output signal of the hazard warning switch is inputted to the U terminal. The engine start control unit 13 reads the signals inputted to both terminal V and terminal U in the failsafe mode. The operation of this embodiment is substantially the same as the operation of the first embodiment that is described with reference to the flow diagram shown in FIG. 2.

Figure 8A:
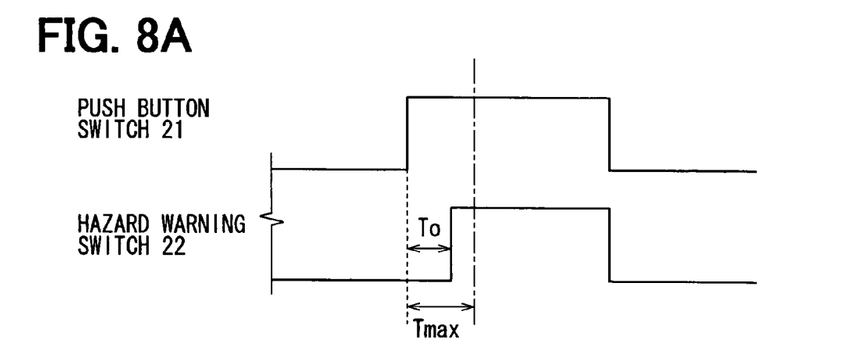
FIGS. 8A and 8B are timing diagrams of first and second examples of failsafe operation.

One example of the failsafe mode operation will be described with reference to FIG. 8A. In this case, the engine starting is allowed if the hazard warning switch 22 is pushed after the push button switch 21 is pushed by a time To that is less than T max.

Figure 8B:
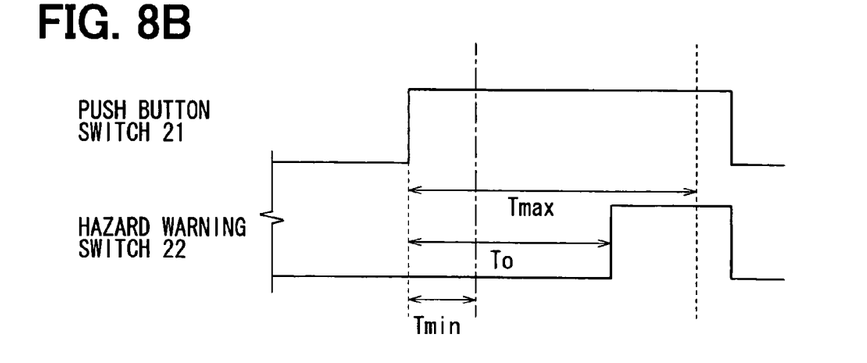

As another example, the engine starting may be allowed if the hazard warning switch 22 is pushed after the push button switch 21 is pushed at a time To that is between T min and T max, as shown in FIG. 8B.

With the above arrangement, only a person who knows the above operation timing can start the engine. The above operation order or timing may be changed as desired. The hazard warning switch 22 may be replaced with a switch of an air conditioner or an audio system.

Figure 9:
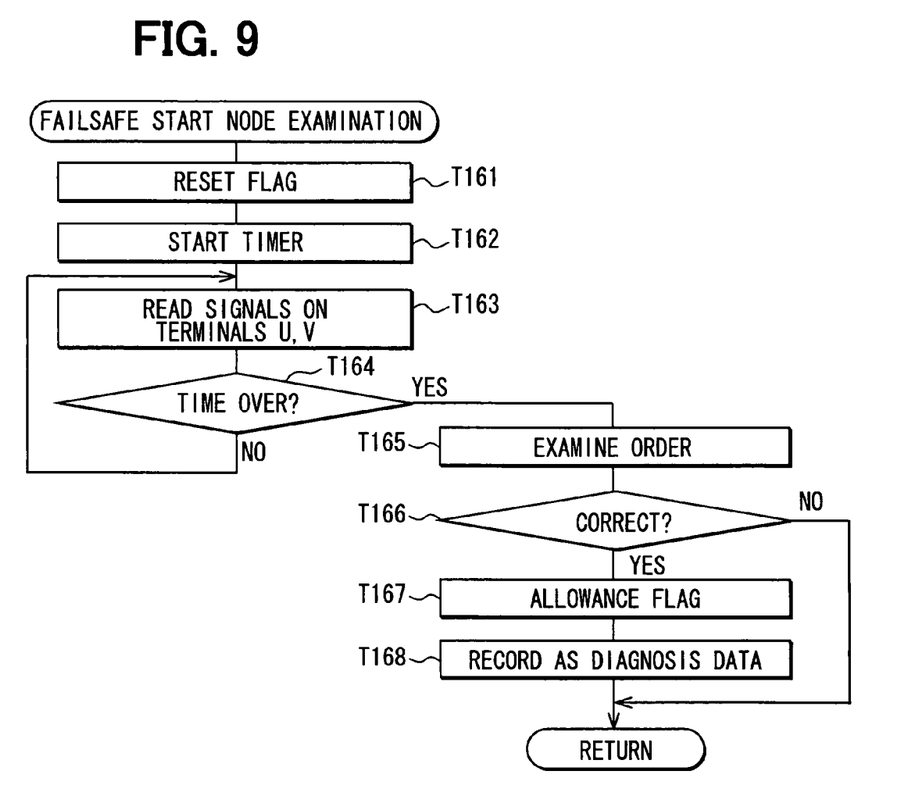
FIG. 9 is a flow diagram of another failsafe start mode examination process.

In order to carry out the above failsafe mode operation, a failsafe engine starting mode examination flow diagram is provided, as shown in FIG. 9.

A failsafe start allowance flag is reset at step T161, and a timer for operation period of the push button switch is set at step T162. Then, signals inputted to the terminals U and V are read at step T163 (i.e. input signal capturing step). Then, if the operation period is over, the input capturing step ends and steps T165 and T166 follow to examine the operation order of the switches 21, 22. If the operation order is correct (Yes), the failsafe start allowance flag is set at step T167. Then, the failsafe engine starting is recorded into the flash memory 53 at step T168. If the operation order is not correct (No), the steps T167, T168 are skipped.

Figure 10:
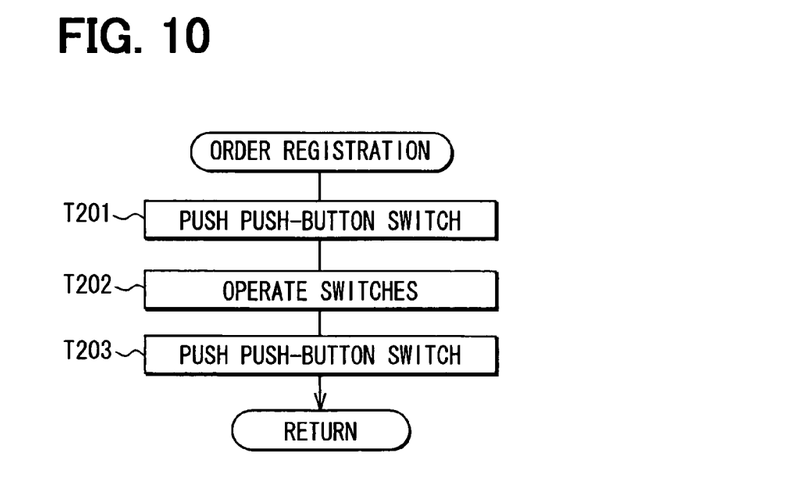
FIG. 10 is a flow diagram of registering inputting another order of switches.

The operation order of the switches 21, 22 can be registered or changed by the push button switch 21 as shown in FIG. 10.

Firstly, the push button switch 22 is pushed to call a registering mode for a fixed time (e.g. until a beeper sounds). Then, the switches 21, 22 are operated (pushed) in an intended order at step T203. Finally, the push button 21 is pushed for a fixed time to end the registration.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A control system for a vehicle having an engine and a brake pedal, the control system comprising;
   a first user-operable switch for starting the engine;
   a second user-operable switch, wherein the second user-operable switch is a hazard warning switch, a user-operable switch of an air conditioner, or a user-operable switch of an audio device;
   a sensor for detecting operation of the brake pedal; and
   an engine start controller for controlling start of the engine, wherein the engine start controller provides a normal mode that allows start of the engine when the first user-operable switch is operated if the sensor detects operation of the brake pedal and a failsafe mode that allows start of the engine when the first and second user-operable switches are operated even if the sensor does not detect operation of the brake pedal.

2. The control system as in claim 1, wherein the engine start controller allows start of the engine in the failsafe mode only when the first user-operable switch and the second user-operable switch are operated in a prescribed manner.

3. The control system as in claim 2, wherein the engine start controller allows start of the engine in the failsafe mode only when the second user-operable switch is operated a predetermined time after the first user-operable switch is operated.

4. An engine start control system for a vehicle that has an engine and a brake pedal comprising:
   a first switch with which a user operates to start an engine;
   a second switch, which is a hazard warning switch, a switch of an air conditioner, or a switch of an audio system;
   a sensor for detecting operation of the brake pedal; and
   an engine start control unit for controlling start of the engine,
   wherein the engine start control unit provides a normal mode that allows to start the engine when the first switch is operated if the sensor detects operation of the brake pedal and a failsafe mode that allows to start the engine when the first and second switch are operated even if the sensor does not detect operation of the brake pedal.

5. The engine start control system as in claim 4, further comprising a third switch wherein the engine start control unit allows to start the engine in the failsafe mode only when the second switch and third switch are operated.

6. The engine start control system, as in claim 4, wherein each of the first and the second switches is a push button type momentary switch.

7. An engine start control system as in claim 4, wherein the engine start control unit allows to start the engine in the failsafe mode only when the first and the second switches are operated in a prescribed operation order.

8. The engine start control system as in claim 7, wherein the engine start control unit allows to start the engine in the failsafe mode only when the second switch is operated a predetermined time after the first switch is operated.

9. The engine start control system as in claim 4, further comprising means for urging failsafe mode.

10. The engine start control system as in claim 9, further comprising a speedometer, wherein the means for urging is disposed at a speedometer.

11. A control system for a vehicle having an engine and a brake pedal, the control system comprising;
   a first user-operable switch for starting the engine;
   a second user-operable switch, wherein the second user-operable switch is a user-operable switch of an air conditioner;
   a sensor for detecting operation of the brake pedal; and
   an engine start controller for controlling start of the engine, wherein the engine start controller provides a normal mode that allows start of the engine when the first user-operable switch is operated if the sensor detects operation of the brake pedal and a failsafe mode that allows start of the engine when the first and second user-operable switches are operated even if the sensor does not detect operation of the brake pedal.

12. A control system for a vehicle having an engine and a brake pedal, the control system comprising;
   a first user-operable switch for starting the engine;
   a second user-operable switch, wherein the second user-operable switch is a user-operable switch of an audio device;
   a sensor for detecting operation of the brake pedal; and
   an engine start controller for controlling start of the engine, wherein the engine start controller provides a normal mode that allows start of the engine when the first user-operable switch is operated if the sensor detects operation of the brake pedal and a failsafe mode that allows start of the engine when the first and second user-operable switches are operated even if the sensor does not detect operation of the brake pedal.

* * * * *